June 26, 1945.                W. A. LAIRD                2,379,162
                  AUTOMATIC, POSITIVE ACTION PACKER
                        Filed March 31, 1944
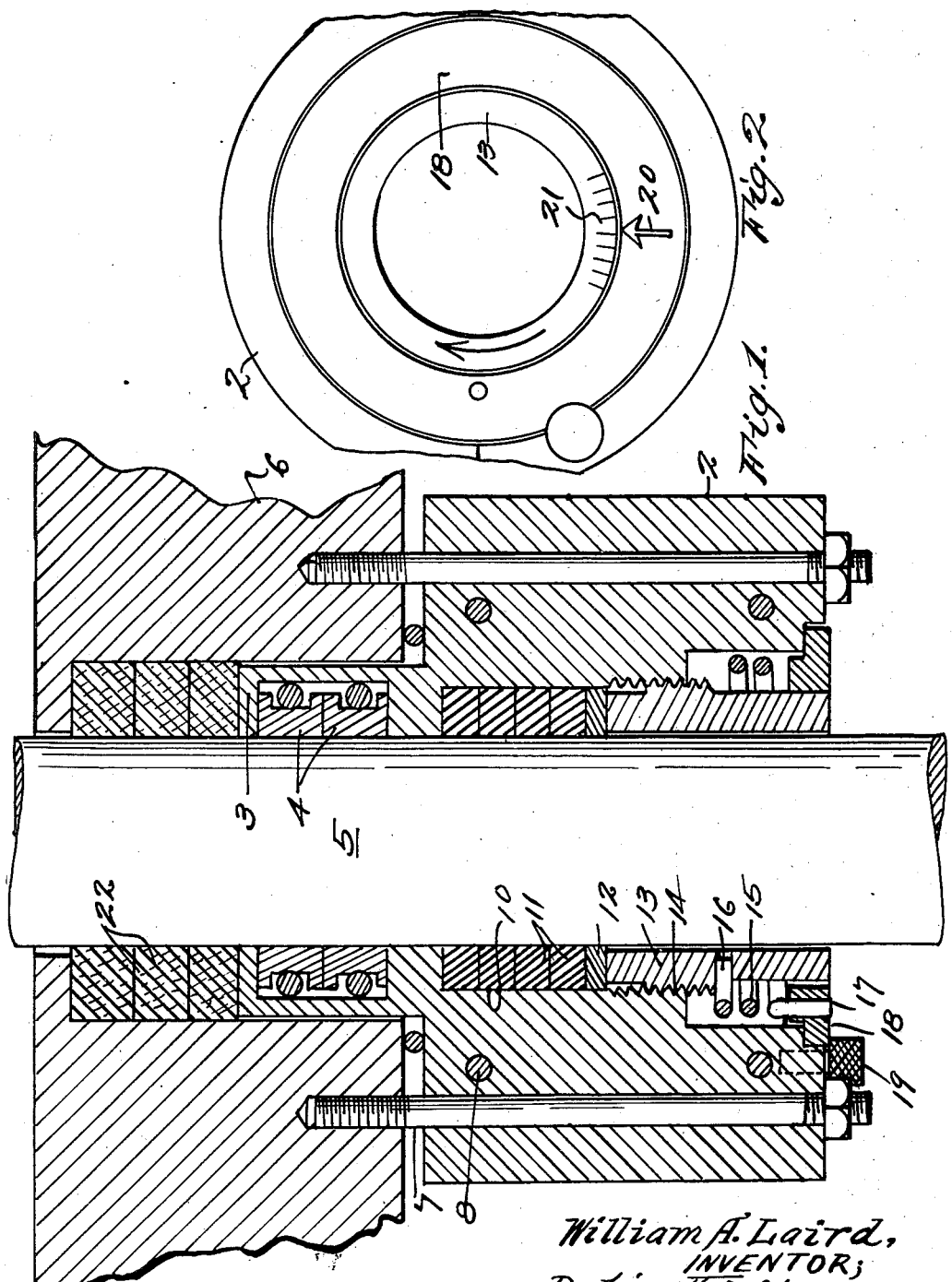
William A. Laird,
    INVENTOR;
By his attorney,
Frederick E. Maynard Patented June 26, 1945

2,379,162

UNITED STATES PATENT OFFICE 2,379,162

AUTOMATIC, POSITIVE ACTION PACKER

William A. Laird, South Gate, Calif.

Application March 31, 1944, Serial No. 528,974

3 Claims. (Cl. 286—35)

This invention is a packing device or assembly for use in connection with reciprocating rods and shafts to prevent leakage of fluid pressure thereat in the operation of various kinds of machines.

It is an old and well known practice to employ spring devices for constant compression of given packing masses in their machine glands but there are practical objections to such spring pressed packings in that the spring action is not positive in nature.

It is one object of this invention to provide a follower sleeve for directly and positively acting on given packing to reliably sustain it, the packing, against pressure fluid reaction.

A further object of the invention is to provide for the ready adjustment of the positive action follower sleeve from time to time to take up wear of the installed packing.

Another object of the invention is to provide an organized packer assembly having an automatically operative packer follower of the stated positive type, and to provide a device of this kind which may be readily re-adjusted from time to time during the life of the installed packing mass.

And additionally, an object of the invention is to provide an indicator for showing the rate of automatic advance of the packing follower.

Also, an object of the invention is to provide an automatic packer assembly in which there is combined a torque maintaining spring controlling the follower and having means for readily adjusting the torque spring from time to time as the packing wears away.

The invention consists in certain advancements in this art as set forth in the ensuing disclosure and having, with the above, additional objects and advantages as hereinafter developed, and whose constructions, combinations and sub-combinations and details of means, and the manner of operation will be made manifest in the following description of the herewith illustrative embodiment; it being understood that modifications, variations and adaptations may be resorted to within the scope, spirit and principle of the invention as it is more particularly claimed in the addendum.

Figure 1 is a partial axial section and plan of the installed packer assembly; the plane face of a longitudinally split packer box being shown.

Figure 2 is a front end elevation of the assembly; the sides of the box being broken away.

The invention embraces several parts which when made up ready for installation comprise an organized unit or assembly attachable as such to a given supporting part, such as the head of a pump, engine or other kind of machine having a rod or shaft working from a fluid pressure chamber and where packing mass is requisite to prevent, or reduce fluid leak during operation of the machine.

The assembly includes a substantial block or box 2 which may or may not have an end nipple 3 internally bored to receive suitable packing 4 fitting an introduced rod or shaft 5 working through a head 6 which here forms a support to which the box 2 is fixed as by bolts 7. The box 2 is suitably divided into separable parts to provide for the insertion of the packing 4; in the form here shown the box is longitudinally split on a diametrical plane and has fastening screws 8 fixing them together.

The body of the box 2 is suitably bored at 10 to snugly receive a suitable, soft packing 11 which fits the central rod 5 and is endwise engaged by a simple follower ring 12.

A feature of this invention is provision of a follower device in the form of an elongate sleeve 13 fitting the rod 5 and threaded at 14 in the box bore 10 and engaging the ring 12 so that as the packing 11 wears away it can be additionally compressed from time to time by inward adjustment of the non-yieldable and positive force follower sleeve 13. It will be seen that this sleeve prevents yielding of the packing 11 under pressure of fluid.

Means are here provided for the automatic advance of the follower sleeve 13 as fast as it may wear away by attrition from the working rod 5, or shaft as the case may be, so that while the take-up action of the packing is automatic at the same time the packing 11 is never released from control of the positive function, follower sleeve 13. Such means here involves a substantial spring 15, of the helical form, having an end hook 16 secured into the sleeve 13 and an outer end hook 17 secured into a tug ring 18 sunk in the box 2 outwardly of the torque spring 15 which is coiled about the outer end of the sleeve and is housed entirely in the bore of the box.

When the unitary assembly has been made up the nipple 3, if any, is telescoped into the support or head 6 and the box 2 is solidly bolted at 7 to be rigid with the support 6, in a position with the rod or shaft 5 projecting forward through the packing 4 in the nipple and the soft packing 11 in the bore of the box.

Such installation having been completed, the engineer or attendant rotates the tug ring 18 by any suitable means to advance the screw sleeve 13 under the desired degree of torque control of and by the intermediate spring 15 and when such degree of torque has been placed on the follower 13 to effect automatic advance of the follower as the packing 11 wears away, then the tug ring is securely locked or fastened as by one or more set screws 19 in the box 2 and which suitably engage the tug ring 18 to releasably hold it at each new angular adjustment for re-torquing the spring 15 as its tension is lost by wearing away of the packing 11, and the incidental inward advance of the sleeve 13.

The outer end faces of the sleeve 11 and of the tug ring 18 are here shown as about relatively flush and are provided with coordinate index devices, as a graduated scale 19 and a pointer or base mark 20 to show degree of automatic unwind of the spring as it turns the sleeve, or the amount of torquing turn of the ring 18.

Should the spring break, the sleeve 13 may be turned from time to time by a suitable hand tool.

Only the packing 11 may be employed but if a double packing is called for then the inner hard packing 4 is employed. In some cases even a third packing is specified in some apparatus and certain fluids at high pressure and if so then a packing mass 22 is matted in a relative bore in the engine head (or pump head) 6.

What is claimed is:

1. A packing device, consisting of a box having a packing receiving bore, a gland sleeve freely screwable into the bore to engage introduced packing material and being housed by the box, a tug ring rotatively mounted on the box, a helical spring surrounding one end of the said sleeve and connected to it to effect axial advance thereof in the box, said ring being attached to the spring to turn it for torque effort on the sleeve, and means for locking the ring at any rotational position thereof on the box.

2. In a rod or shaft packer; a packable bore box, a positive action, compressing follower freely screwable and housed in the box, and adjustable torque means for constantly urging the follower in compression effort to take up wear of the effected packing and including a ring rotatively housed in the box and a torque spring connected to the ring and to the sleeve to axially advance the sleeve, and means to operatively set the ring at any desired position of angular adjustment in the box.

3. In a rod or shaft packing gland assembly; a box having a rod or shaft bore adapted to receive a packing material for the rod or shaft, and a follower sleeve fitted to the rod and threaded into the box for positive compression and constant support of the packing when installed in the box, a torque spring putting a constant turning effort on the sleeve to advance it while constantly supporting the packing against pressure of fluid, and means for adjusting the spring effort from time to time; said sleeve housed in the box and surrounded by the spring and being freely screwable axially in the box.

WILLIAM A. LAIRD.